United States Patent
Gottschalk et al.

[11] Patent Number: 5,883,186
[45] Date of Patent: Mar. 16, 1999

[54] POLYAMIDE/POLYOLEFIN BLENDS

[75] Inventors: Axel Gottschalk, Neustadt; Herbert Fisch, Wachenheim; Gunter Pipper, Bad Dürkheim; Martin Weber, Neustadt, all of Germany

[73] Assignee: BASF Aktiengesellschaft, Ludwigshafen, Germany

[21] Appl. No.: 880,540

[22] Filed: Jun. 23, 1997

Related U.S. Application Data

[63] Continuation of Ser. No. 504,285, Jul. 19, 1995, abandoned.

[30] Foreign Application Priority Data

Jul. 26, 1994 [DE] Germany ............... 44 26 434.8

[51] Int. Cl.$^6$ .................. C08G 63/48; C08G 63/91; C08L 51/00; C08L 63/00
[52] U.S. Cl. ..................... 525/66; 525/178; 525/179; 525/180; 525/181; 525/182; 525/183
[58] Field of Search ................ 525/66, 178, 179, 525/180, 181, 182, 183

[56] References Cited

U.S. PATENT DOCUMENTS

| | | | |
|---|---|---|---|
| 3,597,400 | 8/1971 | Kashiro et al. | 260/78 R |
| 5,317,059 | 5/1994 | Chundury et al. | 525/66 |
| 5,387,645 | 2/1995 | Montag et al. | 525/66 |
| 5,405,904 | 4/1995 | Ikejiri et al. | 524/394 |
| 5,436,294 | 7/1995 | Desio et al. | 525/66 |

FOREIGN PATENT DOCUMENTS

| | | |
|---|---|---|
| 345486 | 12/1989 | European Pat. Off. |
| 519 248 | 12/1992 | European Pat. Off. |
| 540 842 | 5/1993 | European Pat. Off. |
| 1933395 | 7/1969 | Germany |
| 35 07 128 | 6/1993 | Germany |
| 1403797 | 8/1975 | United Kingdom |
| 2194540 | 3/1988 | United Kingdom |
| 2 226 035 | 6/1990 | United Kingdom |

*Primary Examiner*—Nathan M. Nutter
*Attorney, Agent, or Firm*—Keil & Weinkauf

[57] ABSTRACT

Thermoplastic molding materials contain

A) from 4 to 95% by weight of a semicrystalline, partly aromatic copolyamide composed of
  $a_1$) from 30 to 44 mol % of units which are derived from terephthalic acid,
  $a_2$) from 6 to 20 mol % of units which are derived from isophthalic acid,
  $a_3$) from 43 to 49.5 mol % of units which are derived from hexamethylenediamine and
  $a_4$) from 0.5 to 7 mol % of units which are derived from aliphatic cyclic diamines of 6 to 30 carbon atoms,
the molar percentages of components $a_1$) to $a_4$) together giving 100%, and B) from 4 to 95% by weight of a polyolefin homo- or copolymer or a mixture thereof, C) from 1 to 20% by weight of a compatibilizer, D) from 0 to 20% by weight of an elastomeric polymer, E) from 0 to 50% by weight of a fibrous or particulate filler and F) from 0 to 30% by weight of conventional additives and processing assistants, the percentages by weight of components A to F together giving 100%.

8 Claims, No Drawings

POLYAMIDE/POLYOLEFIN BLENDS

This application is a continuation of application Ser. No. 08/504,285, filed on Jul. 19, 1995, now abandoned.

The present invention relates to thermoplastic molding materials containing

A) from 4 to 95% by weight of a semicrystalline, partly aromatic copolyamide composed of
  $a_1$) from 30 to 44 mol % of units which are derived from terephthalic acid,
  $a_2$) from 6 to 20 mol % of units which are derived from isophthalic acid,
  $a_3$) from 43 to 49.5 mol % of units which are derived from hexamethylenediamine and
  $a_4$) from 0.5 to 7 mol % of units which are derived from aliphatic cyclic diamines of 6 to 30 carbon atoms, the molar percentages of components $a_1$) to $a_4$) together giving 100%, and B) from 4 to 95% by weight of a polyolefin homo- or co-polymer or a mixture thereof,
C) from 1 to 20% by weight of a compatibilizer,
D) from 0 to 20% by weight of an elastomeric polymer,
E) from 0 to 50% by weight of a fibrous or particulate filler and
F) from 0 to 30% by weight of conventional additives and processing assistants, the percentages by weight of components A to F together giving 100%.

The present invention furthermore relates to the use of the thermoplastic molding materials for the production of fibers, films and moldings and to the moldings obtainable thereby.

Polyolefins, such as polypropylene, have good solvent resistance, low water absorption and very good processability, and combination with polyamides, which generally have higher melting points, is therefore desirable for many applications.

Since the two polymer phases are in general incompatible, compatibilizers must be added to these blends in order to achieve good dispersing and mutual anchoring of the two polymer phases.

Blends of olefins and polyamides are disclosed in GB-A 1 403 797.

The blends contain, as a compatibilizer, a polypropylene grafted with maleic anhydride.

DE-A 3 507 128 discloses terpolymers of ethylene, n-butyl acrylate and acrylic acid as compatibilizers in PP/PA blends.

GB-A 2 226 035 discloses compatibilizer mixtures comprising polyolefin rubbers, grafted copolymers of polypropylene and a grafted polyolefin rubber.

Overall, prior art molding materials have improved properties compared with molding materials without compatibilizers, but the impact strength, in particular the multiaxial impact strength, is unsatisfactory.

Furthermore, delamination and decomposition problems occur during the processing of these blends, since the melting points and melt viscosities of the individual polymers generally have too large a difference for a viable blend. With regard to the very low water absorption of the polyolefin, a combination with polyamides, which are used in particular for long periods at elevated temperatures, would however be desirable.

EP-A 519 248 discloses blends of polyolefins with partly aromatic copolyamides, which can be used for long periods at elevated temperatures. However, the processing properties are still worthy of improvement, since the large difference between the melting points of the two polymers results in moldings whose mechanical properties are still worthy of improvement.

It is an object of the present invention to provide thermoplastic molding materials which are based on polyamides and polyolefins and have good processing stability in combination with a good impact strength/rigidity ratio (relatively high modulus of elasticity in combination with relatively high multiaxial impact strength). Furthermore, such molding materials should exhibit a high joint line strength and heat distortion resistance.

We have found that this object is achieved, according to the invention, by the thermoplastic molding materials defined at the outset. Preferred materials of this type and the use thereof are described in the subclaims.

The novel molding materials contain, as component A), from 4 to 95, preferably from 20 to 75, in particular from 40 to 70%, by weight of a partly aromatic semicrystalline copolyamide composed of $a_1$) from 30 to 44, preferably from 32 to 40, in particular from is 32 to 38, mol % of units which are derived from terephthalic acid,
  $a_2$) from 6 to 20, preferably from 10 to 18, in particular from 12 to 18, mol % of units which are derived from isophthalic acid,
  $a_3$) from 43 to 49.5, preferably from 46 to 48.5, in particular from 46.3 to 48.2, mol % of units which are derived from hexamethylenediamine and
  $a_4$) from 0.5 to 7, preferably from 1.5 to 4, in particular from 1.8 to 3.7, mol % of units which are derived from aliphatic cyclic diamines of 6 to 30, preferably 13 to 29, in particular 13 to 17, carbon atoms, the molar percentages of components $a_1$) to $a_4$) together giving 100%.

The diamine units $a_3$) and $a_4$) are preferably reacted with the dicarboxylic acid units $a_1$) and $a_2$) in equimolar amounts.

Suitable monomers $a_4$) are preferably cyclic diamines of the formula

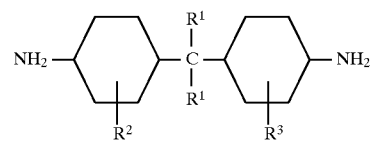

where $R^1$, $R^2$ and $R^3$ are each hydrogen or $C_1$–$C_4$-alkyl.

Particularly preferred diamines $a_4$) are bis(4-aminocyclohexyl)-methane, bis(4-amino-3-methylcyclohexyl)methane, bis(4-aminocyclohexyl)-2,2-propane and bis(4-amino-3-methylcyclohexyl)-2,2-propane.

Examples of further monomers $a_4$) are 1,3- and 1,4-cyclohexanediamine and isophorone diamine.

In addition to the units $a_1$) to $a_4$) described above, the partly aromatic copolyamides A) may contain up to 4, preferably up to 3.5%, by weight (based on 100% by weight of A) of further polyamide-forming monomers $a_5$), as disclosed for other polyamides.

Aromatic dicarboxylic acids $a_5$) are of 8 to 16 carbon atoms. Examples of suitable aromatic dicarboxylic acids are substituted terephthalic and isophthalic acids, such as 3-tert-butyl isophthalic acid, and polynuclear dicarboxylic acids, eg. 4,4'- and 3,3'-biphenyldicarboxylic acid, 4,4'- and 3,3'-diphenylmethanedicarboxylic acid, 4,4'- and 3,3'-dicarboxydiphenyl sulfone, 1,4- and 2,6-naphthalenedicarboxylic acid and phenoxyterephthalic acid.

Further polyamide-forming monomers $a_5$) may be derived from dicarboxylic acids of 4 to 16 carbon atoms and aliphatic diamines of 4 to 16 carbon atoms and from aminocarboxylic acids or corresponding lactams of 7 to 12 carbon atoms. Suitable monomers of these types are suberic acid, azelaic acid and sebacic acid, mentioned here merely as typical aliphatic dicarboxylic acids, 1,4-butanediamine, 1,5-pentanediamine and piperazine, mentioned here merely as typical diamines, and caprolactam, capryllactam, enantholactam, ω-aminoundecanoic acid and laurolactam, mentioned here merely as typical lactams and aminocarboxylic acids.

Partly aromatic copolyamides whose triamine content is less than 0.5, preferably less than 0.3% by weight, have also proven particularly advantageous.

Partly aromatic copolyamides prepared by most known processes (cf. U.S. Pat. No. 4,603,166) have triamine contents of more than 0.5% by weight, which leads to a deterioration in the product quality and to problems during continuous production. A particular triamine which causes these problems is dihexamethylenetriamine, which forms from the hexamethylenediamine used in the preparation.

At the same solution viscosity, copolyamides having a low triamine content have lower melt viscosities compared with products of the same composition which have a higher triamine content. This considerably improves both the processability and the product properties.

The melting points of the partly aromatic copolyamides are from 290° to 340° C., preferably from 292° to 330° C., this melting point being associated with a high glass transition temperature of, as a rule, more than 120° C., in particular more than 130° C. (in the dry state).

According to the invention, the partly aromatic copolyamides are to be understood as meaning those which have a crystallinity of >30%, preferably >35%, in particular >40%.

The crystallinity is a measure of the proportion of crystalline fragments in the copolyamide and is determined by X-ray diffraction or indirectly by measuring $\Delta H_{cryst}$.

Mixtures of the partly aromatic copolyamides may of course also be reacted, any mixing ratio being possible.

Suitable processes for the preparation of the novel copolyamides are known to a person skilled in the art.

The preferred method of preparation is the batch process. Here, the aqueous monomer solution is heated to 280°–340° C. in the course of from 0.5 to 3 hours in an autoclave, the resulting pressure of 10–50, in particular 15–40, bar being kept as far as possible constant for up to 2 hours by releasing excess steam. The autoclave is then let down at constant temperature in the course of 0.5–2 hours until a final pressure of from 1 to 5 bar has been reached. The polymer melt is then discharged, cooled and granulated.

Another preferred process is carried out similarly to the processes described in EP-A 129 195 and 129 196.

In these processes, an aqueous solution of the monomers $a_1$) to $a_4$) and, if required, $a_5$), having a monomer content of from 30 to 70, preferably from 40 to 65%, by weight, is heated to 280° to 330° C. in the course of less than 60 seconds under superatmospheric pressure (from 1 to 10 bar) and with simultaneous evaporation of water and formation of a prepolymer, after which prepolymer and steam are separated continuously, the steam is rectified and the entrained diamines are recycled. Finally, the prepolymer is passed into a polycondensation zone and subjected to polycondensation under superatmospheric pressure of from 1 to 10 bar and at from 280° to 330° C. during a residence time of 5–30 minutes. of course, the temperature in the reactor is above the melting point of the resulting prepolymer, required at the particular steam pressure.

As a result of these short residence times, the formation of triamines is substantially prevented.

The resulting polyamide prepolymer, which as a rule has a viscosity number of from 40 to 70, preferably from 40 to 60 ml/g, measured in a 0.5% strength by weight solution in 96% strength sulfuric acid at 25° C., is removed continuously from the condensation zone.

In a preferred procedure, the resulting polyamide prepolymer is passed in molten form through a discharge zone with simultaneous removal of the residual water present in the melt. Suitable discharge zones are, for example, devolatilization extruders. The melt freed from water in this manner is then extruded and the extrudate is granulated.

In a particularly preferred procedure, it is also possible to add components B) and C) and, if required, D) to F) to the prepolymer of component A) in the devolatilization extruder itself, in which case said extruder is usually equipped with suitable mixing elements, such as kneading blocks. The product is then likewise extruded and the extrudate cooled and granulated.

These granules are subjected to continuous or batchwise solid-phase condensation under an inert gas at a temperature below the melting point, for example from 170° to 240° C., until the desired viscosity is obtained. For example, tumble driers may be used for the batchwise solid-phase condensation and heating tubes through which hot inert gas flows may be used for the continuous solid-phase condensation. The continuous solid-phase condensation is preferred, the inert gas used being nitrogen or in particular superheated steam, advantageously the steam obtained at the top of the column.

The viscosity number after the solid-phase postcondensation or the other abovementioned preparation processes is in general from 100 to 500, preferably from 110 to 200 ml/g, measured in a 0.5% strength by weight solution in 96% strength sulfuric acid at 25° C.

The novel molding materials contain, as component B), from 4 to 95, preferably from 23 to 75, in particular from 28 to 55%, by weight of a polyolefin homo- or copolymer or a mixture thereof.

Component B) has in general a melting point of >90° C., preferably >125° C., in particular >160° C.

Examples of suitable polyolefin homopolymers are polyethylene, polypropylene and polybutene, polypropylene being preferred.

Suitable polyethylenes are very low density polyethylenes (LLDPE), low density polyethylenes (LDPE), medium density polyethylenes (MDPE) and high density polyethylenes (HDPE). These are polyethylenes which have short or long branched chains or which are linear and which are prepared in a high pressure process in the presence of free radical initiators (LDPE) or in a low pressure process in the presence of complex initiators, for example Phillips or Ziegler-Natta catalysts (LLDPE, MDPE and HDPE). The short-chain branches in LLDPE or MDPE are introduced by copolymerization with α-olefins (eg. butene, hexene or octene).

LLDPE generally has a density of from 0.9 to 0.93 g/cm$^3$ and a melting point (determined by means of differential thermal analysis) of from 120° to 130° C., LDPE a density of from 0.915 to 0.935g/cm$^3$ and a melting point of from 105° to 115° C., MDPE a density of from 0.93 to 0.94 g/cm$^3$ and a melting point of from 120° to 130° C. and HDPE a density of from 0.94 to 0.97 g/cm$^3$ and a melting point of from 128° to 136° C.

The flow, measured as the melt volume index MVI, is generally from 0.05 to 35 g/10 min. The melt flow index corresponds to the amount of polymer which is forced out of the test apparatus standardized according to DIN 53 735 in the course of 10 minutes at 190° C. and 2.16 kg load.

The novel molding materials preferably contain polypropylene as component B).

Suitable polypropylenes are known to a person skilled in the art and are described, for example, in Kunststoffhandbuch, Volume IV, Polyolefine, Carl Hanser Verlag, Munich.

The melt volume index MVI according to DIN 53 735 is in general from 0.3 to 80, preferably from 0.5 to 35 g/10 min at 230° C. and 2.16 kg load.

Such polypropylenes are usually prepared by low-pressure polymerization using metal-containing catalysts, for example with the aid of titanium- and aluminum-containing Ziegler catalysts or, in the case of polyethylene, also by means of Phillips catalysts based on chromium-containing compounds. The polymerization reaction can be carried out using the reactors conventionally employed in industry, in the gas phase, in solution or in suspension.

In the preparation of the novel polymer blend, the polyethylene or polypropylene may be used both as coarse powder and as granules. Mixtures of polyethylene with polypropylene may also be used, any mixing ratio being possible.

Other suitable components B) are copolymers of ethylene with α-olefins, such as propylene, butene, hexene, pentene, heptene and octene, or with nonconjugated dienes, such as norbornadiene and dicyclopentadiene. Copolymers B) are to be understood as meaning both random and block copolymers.

Random copolymers are usually obtained by polymerization of a mixture of different monomers, and block copolymers by successive polymerization of different monomers.

The novel molding materials contain, as component C), from 1 to 20, preferably from 2 to 15, in particular from 2 to 12%, by weight of a compatibilizer which differs from D) and B). This is a polymer which has sufficient affinity to both component A) and component B). Accordingly, the interfacial tension between A) and B) is reduced, better phase dispersion and phase binding being achieved.

Suitable polymers as compatibilizers C) are the polyolefin homo- and copolymers which are described under B) and contain from 0.1 to 20, preferably from 0.2 to 10, in particular from 0.2 to 5%, by weight (based on 100% by weight of component C) of functional monomers.

Functional monomers are to be understood as meaning monomers which contain carboxyl, anhydride, amido, imido, carboxylic ester, amino, hydroxyl, epoxy, oxazolyl, urethane, urea or lactam groups and additionally have a reactive double bond.

Examples of these are methacrylic acid, maleic acid, maleic anhydride, fumaric acid, itaconic acid and the alkyl esters of the above acids and their amides, maleimide, allylamine, allyl alcohol, glycidyl methacrylate, vinyl oxazoline, isopropenyloxazoline and methacryloylcaprolactam.

The functional monomers may be introduced into the polymer chain either by copolymerization or by grafting. The grafting can be carried out either in solution or in the melt, and free radical initiators, such as peroxides, hydroperoxides, peresters and percarbonates, may also be used.

Such compatibilizers are generally commercially available (Polybond®, Exxelor®, Hostamont®, Admer®, Orevac®, Epolene® and Hostaprime®).

The novel molding materials may contain from 0 to 20, preferably from 0 to 15, in particular from 0 to 10%, by weight of an elastomeric polymer which differs from B) and C). Such polymers are often also referred to as impact strength-modifying polymers, impact modifiers, elastomers or rubbers.

The component D) contains in general at least one elastomer phase whose softening temperature is below −25° C., preferably below −30° C.

Impact modifiers which increase the impact strength of component B) are copolymers of ethylene with propylene and, if required, with a conjugated diene (EP or EPDM rubbers), the ethylene content preferably being 45, in particular 50%, by weight (based on 100% by weight of component D)).

Such impact modifiers are generally known, and reference may therefore be made to the publication by Cartasegna in Kautschuk, Gummi, Kunststoffe 39 (1986), 1186–1191 for further details.

Rubbers which increase the impact strength of polyamides have in general two essential features: they contain an elastomeric component which has a glass transition temperature of less than −10° C., preferably less than −30° C., and they contain at least one functional group capable of reacting with the polyamide. Examples of suitable functional groups are carboxyl, anhydride, carboxylic ester, carboxamido, carboximido, amino, hydroxyl, epoxy, urethane and oxazolyl.

Examples of rubbers which increase the impact strength of polyamides are EP and EPDM rubbers which have been grafted with the abovementioned functional groups. Examples of suitable grafting reagents are maleic anhydride, itaconic acid, acrylic acid, glycidyl acrylate and glycidyl methacrylate. These monomers can be grafted onto the polymer in the melt or in solution, in the presence or absence of a free radical initiator, such as cumyl hydroperoxide.

Copolymers of α-olefins may also be mentioned. The α-olefins are usually monomers of 2 to 8 carbon atoms, preferably ethylene and propylene. Comonomers which have proven suitable are alkyl acrylates or alkyl methacrylates which are derived from alcohols of 1 to 8 carbon atoms, preferably ethanol, butanol or ethylhexanol, and reactive comonomers, such as acrylic acid, methacrylic acid, maleic acid, maleic anhydride or glycidyl (meth)acrylate, as well as vinyl esters, in particular vinyl acetate. Mixtures of different comonomers may also be used. Copolymers of ethylene with ethyl or butyl acrylate and acrylic acid and/or maleic anhydride have proven particularly useful.

The copolymers can be prepared in a high pressure process at from 400 to 4500 bar or by grafting the comonomers onto the poly-α-olefin. The amount of the α-olefin in the copolymer is in general from 99.95 to 55% by weight.

A further group of suitable elastomers comprises core/shell graft rubbers. These are graft rubbers which have been prepared in emulsion and consist of at least one rigid and one flexible component. A rigid component is usually understood as meaning a polymer having a glass transition temperature of at least 25° C., while a flexible component is understood as meaning a polymer having a glass transition temperature of no more than 0° C. These products have a structure comprising a core and at least one shell, the structure being determined by the order of addition of the monomers. The flexible components are derived in general from butadiene, isbprene, alkyl acrylates or alkyl methacrylates and, if required, further comonomers. Examples of suitable comonomers here are styrene, acrylonitrile and crosslinking or graft-linking monomers having more than one polymerizable double bond, such as diallyl phthalate, divinylbenzene, butanediol diacrylate or triallyl (iso) cyanurate. The rigid components are derived in general from styrene, α-methylstyrene and copolymers thereof, acrylonitrile, methacrylonitrile and methyl methacrylate being preferred comonomers here.

Preferred core/shell graft rubbers contain a flexible core and a rigid shell or a rigid core, a first flexible shell and at least one further rigid shell. Functional groups, such as carbonyl, carboxyl, anhydride, amido, imido, carboxylic ester, amino, hydroxyl, epoxy, oxazolyl, urethane, urea, lactam or halobenzyl, are preferably incorporated here by adding suitable functionalized monomers during the polymerization of the final shell. Suitable functionalized monomers are, for example, maleic acid, maleic anhydride, mono- or diesters of maleic acid, tertbutyl (meth)acrylate, acrylic acid, glycidyl (meth)acrylate and vinyloxazoline. The amount of monomers having functional groups is in general from 0.1 to 25, preferably from 0.25 to 15%, by weight, based on the total weight of the core/shell graft rubber. The weight ratio of flexible to rigid components is in general from 1:9 to 9:1, preferably from 3:7 to 8:2.

Such rubbers which increase the impact strength of polyamides are known per se and are described, for example, in EP-A 208 187.

A further group of suitable impact modifiers comprises thermoplastic polyester elastomers. Polyester elastomers are understood as meaning segmented copolyether esters which contain long-chain segments derived as a rule from poly (alkylene) ether glycols and short-chain segments derived from low molecular weight diols and dicarboxylic acids. Such products are known per se and are described in the literature, for example in U.S. Pat. No. 3,651,015. Corresponding products are also commercially available under the names Hytrel® (Du Pont), Arnitel® (Akzo) and Pelprene®.

Mixtures of different rubbers may of course also be used.

The novel molding materials may contain, as further component, from 0 to 50, preferably up to 35%, by weight of a fibrous or particulate filler (component (E)) or a mixture thereof.

Preferred fibrous reinforcing materials are carbon fibers, potassium titanate whiskers, aramid fibers and particularly preferably glass fibers. When glass fibers are used, they may be provided with a size and an adhesion promoter to ensure better compatibility with the thermoplastic polyamide (A). In general, the glass fibers used have a diameter of from 6 to 20 μm.

These glass fibers may be incorporated both in the form of short glass fibers and in the form of rovings. In the finished injection molding, the average length of the glass fibers is preferably from 0.08 to 0.5 mm.

Suitable particulate fillers are amorphous silica, magnesium carbonate (chalk), kaolin (in particular calcined kaolin), powdered quartz, mica, talc, feldspar and in particular calcium silicates, such as wollastonite.

Preferred combinations of fillers are, for example, 20% by weight of glass fibers with 15% by weight of wollastonite and 15% by weight of glass fibers with 15% by weight of wollastonite.

In addition to the essential components A) to C) and, if required, D) and/or E), the novel molding materials may contain conventional additives and processing assistants F). The amount thereof is in general up to 30, preferably up to 15%, by weight, based on the total weight of components (A) to (F).

Conventional additives are, for example, stabilizers and antioxidants, heat stabilizers and UV stabilizers, lubricants and mold release agents, dyes and pigments and plasticizers.

Pigments and dyes are generally present in amounts of up to 4, preferably from 0.5 to 3.5, in particular from 0.5 to 3%, by weight.

The pigments for coloring thermoplastics are generally known (cf. for example R. Gächter and H. Müller, Taschenbuch der Kunststoffadditive, Carl Hanser Verlag, 1983, pages 494 to 510). A first preferred group of pigments comprises white pigments, such as zinc oxide, zinc sulfide, lead white (2 $PbCO_3 \cdot Pb(OH)_2$), lithopone, antimony white and titanium dioxide. Of the two most commonly used modifications of titanium dioxide (rutile and anatase), the rutile form in particular is used for imparting whiteness to the novel molding materials.

Black pigments which may be used according to the invention are iron oxide black ($Fe_3O_4$), spinel black ($Cu(Cr, Fe)_2O_4$), manganese black (mixture of manganese dioxide, silica and iron oxide), cobalt black and antimony black and particularly preferably carbon black, which is generally used in the form of furnace black or gas black (cf. C. Benzing, Pigmente für Anstrichmittel, Expert-Verlag (1988), page 78 et seq.).

Inorganic colored pigments, such as chromium oxide green, and organic colored pigments, such as azo pigments and phthalocyanines, may of course be used according to the invention for obtaining certain hues. Such pigments are generally commercially available.

It may also be advantageous to use the stated pigments or dyes as a mixture, for example carbon black with copper phthalocyanines, since the dispersing of colorants in the thermoplastic is generally facilitated.

Antioxidants and heat stabilizers which may be added to the thermoplastic materials according to the invention are, for example, halides of metals of group I of the Periodic Table, for example sodium halides, potassium halides and lithium halides, if necessary in combination with copper(I) halides, for example chlorides, bromides or iodides. The halides, in particular those of copper, may also contain electron-rich π ligands. Examples of such copper complexes are copper halide complexes with, for example, triphenylphosphine. Zinc fluoride and zinc chloride may also be used. Sterically hindered phenols, hydroquinones, substituted members of this group, secondary aromatic amines, if desired in combination with phosphorus-containing acids or salts thereof, and mixtures of these compounds may also be used, preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Lubricants and mold release agents, which are added as a rule in amounts of up to 1% by weight of thermoplastic material, are stearic acid, stearyl alcohol, alkyl stearates and stearamides as well as esters of pentaerythritol with long-chain fatty acids. Salts of calcium, of zinc or of aluminum with stearic acid and dialkyl ketones, eg. distearyl ketone, may also be used.

The additives include stabilizers which prevent decomposition of the red phosphorus in the presence of moisture and atmospheric oxygen. Examples are compounds of cadmium, of zinc, of aluminum, of tin, of magnesium, of manganese and of titanium. Particularly suitable compounds are, for example, oxides of the stated metals, as well as carbonates or basic carbonates, hydroxides and salts of organic or inorganic acids, such as acetates or phosphates or hydrogen phosphates.

Only red phosphorus and the other flameproofing agents known per se for polyamides are mentioned here as flameproofing agents.

The novel thermoplastic molding materials can be prepared by methods known per se, by mixing the starting components in a conventional mixing apparatus, such as an extruder, a Brabender mill or a Banbury mill, and then extruding the mixture. After extrusion, the extrudate is cooled and comminuted.

The novel molding materials have relatively high heat distortion resistance, and good multiaxial impact strength in combination with a good modulus of elasticity. In particular, they can be readily processed by a thermoplastic method and accordingly are suitable for the production of fibers, films and moldings. Fiber-reinforced moldings have a very good surface and are therefore particularly suitable for applications in automotive construction.

EXAMPLES

Component A)

An aqueous solution of about 60% strength and consisting of terephthalic acid (32.2 mol %=37.5% by weight), isophthalic acid (17.8 mol %=20.6% by weight), hexamethylenediamine (48.1 mol %=39.1% by weight or 1.9 mol %=2.8% by weight), bis(4-aminocyclohexyl)methane and 0.174 kg of propionic acid and 100 kg of water was conveyed from a heated storage container at about 80° C. at a rate corresponding to 5 kg/h of polyamide by means of a metering pump into a tubular evaporator arranged partly horizontally and partly vertically. The evaporator was heated by means of a liquid heating medium, which was at 326° C., with vigorous circulation. The evaporator had a length of 3 m, a capacity of 180 ml and a heat-transfer surface area of about 1300 cm². The residence time in the evaporator was 50 seconds. The prepolymer/steam mixture emerging from the evaporator was at 310° C. and was separated into steam and melt in a separator. The melt remained in the separator for a further 10 minutes and was then extruded by means of a discharge screw having a devolatilization zone, solidified in a water bath and then granulated. The separator and the evaporator zone were kept at 5 bar by a pressure control means which was arranged downstream of the column. The steam separated off in the separator was fed into a packed column which had about 10 theoretical plates and into which about 1 l of vapor condensate per hour was introduced at the top in order to generate a reflux. The resulting temperature at the top of the column was 152° C. The steam emerging after the pressure relief valve was condensed and contained less than 0.05% by weight of hexamethylenediamine. An aqueous solution of hexamethylenediamine which contained 80% by weight, based in each case on polyamide produced, of hexamethylenediamine was obtained at the bottom of the column. This solution was recycled to the starting salt solution via a pump before the entrance into the evaporator.

After the polymer melt had emerged from the separator, the polyamide had a very pale natural color and a viscosity number of 48 ml/g (measured as a 0.5% strength solution in 96% strength by weight $H_2SO_4$ at 25° C. according to DIN 53 246).

The product had about equivalent amounts of carboxyl and amino terminal groups.

In the discharge extruder, the melt was let down to atmospheric pressure and underwent virtually no further condensation during a residence time of less than 1 minute.

The product was then heated batchwise in the solid phase in a stationary heating tube (double-walled glass tube which was heated externally with oil to the required temperature and had an internal diameter of 120 mm and a length of 1000 mm and through which 120 l/min of superheated steam flowed) at 200° C. until a viscosity number of 112 ml/g was reached. The residence time was 23 hours. In the course of this heating, a major part of the extractable residual monomers was, if required, also extracted by the steam.

Composition:

$a_1$) 32.2 mol % or 37.5% by weight $a_2$) 17.8 mol % or 20.6% by weight $a_3$) 48.1 mol % or 39.1% by weight $a_4$) 1.9 mol % or 2.8% by weight The specific heat of fusion $\Delta H_{cryst.}$ was determined by means of differential scanning calorimetry (DSC 990 from Du Pont) at a heating rate of 20° C./min, as a relative measure of the crystallinity: 54 J/g.

Component A/1V

A partly aromatic copolyamide according to EP-A 519 248

70% by weight of units which are derived from terephthalic acid and hexamethylenediamine and 30% by weight of units which are derived from ε-caprolactam.

The viscosity number was: 118 ml/g

Component B

|  |  | MVI (230° C./2,16 kg) [g/10 min] (DIN 53 735) | Melting point [°C.] (ISO 3146) |
|---|---|---|---|
| B/1 | Isotactic polypropylene (Novolen ® 1100 from BASF AG) | 2.4 | 165 |
| B/2 | Propylene/ethylene block copolymer (10% by weight of ethylene) (Novolen ® 2500 HX from BASF AG) | 2.7 | 160 |
| B/3 | Propylene/ethylene random copolymer containing 2.5% by weight of ethylene (Novolen ® 3200 HX from BASF AG) | 2.5 | 145 |
|  |  | MFI (190° C./2.16 kg) [g/10 min] |  |
| B/4 | HDPE having a density δ of 0.945 g/cm³ (Lupolen ® 4261 A from BASF AG) | 0.46 (190° C./5 kg) | 131 |
| B/5 | LDPE with δ = 0.926 g/cm³ (Lupolen ® 3020 D from BASF AG) | 0.15–0.35 | 114 |

Component C

C/1: A polypropylene grafted with 0.3% by weight of maleic anhydride (Exxelor® PO 1015 from Exxon)

C/2: Copolymer of LDPE containing 7% by weight of acrylic acid (Lucalen®A 3710 MX from BASF AG) MFI: 10.5 g/10 min, 190° C./21.6 kg, DIN 53 735)

C/3: Polyethylene grafted with 0.1% by weight of maleic anhydride (Admer® L 2100 from Mitsui Petrochemical).

Component D

An EP rubber grafted with 0.4% by weight of maleic anhydride (Exxelor® VA 1803 from Exxon)

Component E

Cut glass fibers having an average diameter of 10 μm and an amino-silanized surface.

Preparation of the molding materials

The amounts of the particular components stated in the table were compounded in a twin-screw extruder (ZSK 30, Werner & Pfleiderer) at 325° C. in a conventional manner. The polymer melt was devolatilized and extruded, the extrudate was passed through a water bath and granulated and the granules were dried. The granules were then processed at 325° C. on an injection molding machine to give standard test specimens.

The multiaxial impact strength $W_{50}$ (total penetration energy) was determined according to DIN 53 443 and the modulus of elasticity according to DIN 53 457.

The compositions of the molding materials and the results of the measurements are shown in the table.

TABLE

| Example | Component A [% by weight] | Component B [% by weight] | Component C [% by weight] | Component D [% by weight] | Component E [% by weight] | Modulus of elasticity [N/mm²] | W₅₀ [Nm] |
|---|---|---|---|---|---|---|---|
| 1* | 55 A/1V | 35 B/1 | 5 C/1<br>5 C/2 | | — | 2150 | 21 |
| 2 | 55 A | 35 B/1 | 5 C/1<br>5 C/2 | | — | 2350 | 28 |
| 3* | 60 A/1V | 35 B/2 | 5 C/1 | | — | 2180 | 22 |
| 4 | 60 A | 35 B/2 | 5 C/1 | | — | 2400 | 30 |
| 5 | 55 A/1V | 35 B/3 | 10 C/1 | | — | 1970 | 19 |
| 6 | 55 A | 35 B/3 | 10 C/1 | | — | 2210 | 33 |
| 7* | 40 A/1V | 35 B/1 | 5 C/1 | | 30 E | 8200 | 2 |
| 8 | 40 A | 30 B/1 | 5 C/1 | | 30 E | 8550 | 4 |
| 9 | 40 A | 35 B/1 | 5 C/1 | 5 D | 30 E | 8400 | 5 |
| 10* | 55 A/1V | 35 B/1 | 5 C/2 | 5 D | — | 1450 | 18 |
| 11 | 55 A/1V | 35 B/4 | 5 C/2 | 5 D | — | 1850 | 31 |
| 12* | 60 A/1V | 35 B/5 | 5 C/2 | | — | 1500 | 10 |
| 13 | 60 A | 35 B/5 | 5 C/2 | | — | 1950 | 26 |
| 14 | 60 A | 35 B/5 | 5 C/3 | | — | 1830 | 22 |

*) Comparative experiment

We claim:

1. Thermoplastic molding material containing
   A) from 4 to 95% by weight of a semicrystalline, partly aromatic copolyamide composed of
      $a_1$) from 30 to 44 mol % of units which are derived from terephthalic acid,
      $a_2$) from 6 to 20 mol % of units which are derived from isophthalic acid,
      $a_3$) from 43 to 49.5 mol % of units which are derived from hexamethylenediamine and
      $a_4$) from 0.5 to 7 mol % of units which are derived from aliphatic cyclic diamines of 6 to 30 carbon atoms,
   the molar percentages of components $a_1$) to $a_4$) together giving 100%, and
   B) from 4 to 95% by weight of a polyolefin homo- or copolymer or a mixture thereof,
   C) from 1 to 20% by weight of a compatibilizer which differs from D) and B),
   D) from 0 to 20% by weight of an elastomeric polymer which differs from B) and C) which has at least one elastomeric phase whose softening point is below −25° C. and,
   E) from 0 to 50% by weight of a fibrous or particulate filler, the percentages by weight of components A) to E) together giving 100% wherein component B has a melting point of >90° C., and components B, C and D differ from each other.

2. A thermoplastic molding material as claimed in claim 1, wherein the copolyamide A) is composed of
   from 32 to 40 mol % of $a_1$),
   from 10 to 18 mol % of $a_2$),
   from 46 to 48.5 mol % of $a_3$) and
   from 1.5 to 4 mol % of $a_4$).

3. A thermoplastic molding material as claimed in claim 1, wherein the aliphatic cyclic diamine $a_4$) is
   bis(4-aminocyclohexyl)methane or
   bis(4-amino-3-methylcyclohexyl)methane
   or a mixture thereof.

4. A thermoplastic molding material as claimed in claim 1, wherein the copolyamide A has a triamine content of less than 0.5% by weight.

5. A thermoplastic molding material as claimed in claim 1, wherein the copolyamide A) has a crystallinity greater than 30%.

6. A thermoplastic molding material as claimed in claim 1, wherein the component B) is polypropylene or polyethylene or an ethylene/propylene copolymer or a mixture thereof.

7. A thermoplastic molding material as claimed in claim 1, wherein the component C) is a homo- or copolymer of an α-olefin, which contains from 0.1 to 20% by weight, based on 100% by weight of component C), of functional monomers which contain a member selected from the group consisting of carboxyl, anhydride, amido, imido, carboxylic ester, amino, hydroxyl, epoxy, oxazolyl, urethane, urea or lactam groups.

8. A molding obtained from a thermoplastic molding material as claimed in claim 1.

* * * * *